2302X
W. Stillman.
Cloth Shearing Mach.
Patented Apr. 28, 1815.
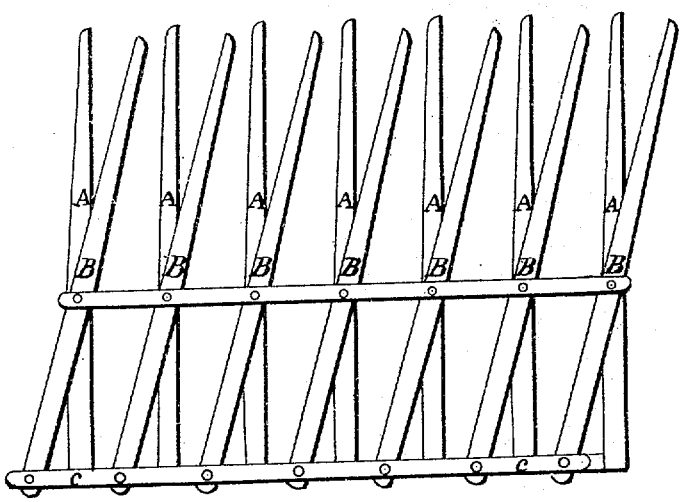
N. PETERS, PHOTO-LITHOGRAPHER, WASHINGTON, D. C.

Apl. 28. 1815 417

William Stillman

2302X

Letters Patent april 28, 1815

The Schedule referred to in these Letters Patent and making part of the same containing a description in the words of the said William Stillman himself of his improvement in Shears for Shearing Cloth.

The distinguishing principle of this improvement consists in having a number of pairs of small Shears abreast, and may be termed a gang of Shears for Shearing cloth. The ledger blade of each pair is placed lengthwise of the piece of cloth to be sheared, and are about six inches long though they may be longer or shorter, and are about four inches apart, though their distance apart may be more or less. There must be a sufficient number of them to extend from one selvage of the cloth to the other.

The runner or flying blades move backward and forward similar to hand shears, they may coupled together with a rod and move all at once, or be moved separately as is found best. While the shears are in operation the whole gang is gradually moved ~~[illegible]~~ until the first pair shear to the place where the next pair began and that pair to where the next pair began, and so on through the gang, thus a strip as wide as the cut of the Shears is long, is sheared quite across the piece of cloth, while the shears move but a very small distance. this being done the whole gang is thrown back to the place where they first began, and begin anew. This operation is continually repeated while the cloth is gradually moving forward across the cushion against which the shears operate, or the cloth may be moved forward by sudden starts, as often as the gang of shears are thrown back. These shears may be applied horizontally or perpendicular-ly over or under the cloth. Again I discover that the side mo-tion may be given either to the cloth or shears, and have the same effect; as to the frame of the machine, and apparatus necessary

2302X to give the several motions above described. they may be variously con[illegible]
ed and is not material since the principle of the discovery consists [illegible]
this one thing (viz) a number of pairs of small shears united [illegible]
a gang, a number of little blades upon one long ledger has before [illegible]
used but these shears have as many ledger blades as there are [illegible]

Witnesses
James Wells 2.d.
Oliver Tarel

Wm. Stillman

Exd. [illegible]

(Patented 25th April 1815) (481[illegible]